United States Patent [19]

Thompson

[11] 4,428,561
[45] Jan. 31, 1984

[54] BALL VALVE HAVING IMPROVED SEAL MEANS

[76] Inventor: William E. Thompson, R.R. 1, Box 89, Middletown, Ind. 47356

[21] Appl. No.: 317,579

[22] Filed: Nov. 2, 1981

[51] Int. Cl.³ .............................................. F16K 35/00
[52] U.S. Cl. ................................... 251/174; 251/171; 251/315; 251/214; 277/166; 277/188 R
[58] Field of Search ................ 251/171, 172, 174, 315, 251/214; 277/166, 186, 188 R, 189, 84

[56] References Cited

U.S. PATENT DOCUMENTS

| | | | |
|---|---|---|---|
| 2,751,185 | 6/1956 | Shand | 251/172 |
| 2,883,146 | 4/1959 | Knox | 251/172 X |
| 2,995,782 | 8/1961 | Heller | 277/166 UX |
| 3,193,250 | 2/1965 | Good | 251/174 X |
| 3,241,808 | 3/1966 | Allen | 251/315 X |
| 3,315,697 | 4/1962 | Oliver | 215/172 X |
| 3,717,293 | 2/1973 | Traub | 277/188 R |
| 4,084,608 | 4/1978 | Laiguel | 251/174 X |
| 4,256,316 | 3/1981 | Reinsma | 277/166 X |
| 4,318,420 | 3/1982 | Calvert | 251/171 X |

*Primary Examiner*—Harold W. Weakley
*Attorney, Agent, or Firm*—Woodard, Weikart, Emhardt & Naughton

[57] ABSTRACT

A ball valve operable between a fully-open position and a closed position for regulating fluid flow includes a valve body machined and arranged with a flow passageway extending completely therethrough and receiving at each end a fluid fitting for coupling to flow lines. Disposed within the interior of the valve body is a ball plug member which is supported below by a stem and needle bearing arrangement and is operable to be turned 90 degrees by a handle, stem and bonnet arrangement. The internal position of the ball plug member is maintained by a pair of ball seats which are centrally disposed within the flow passageway and are held in position by means of adapter cylinders which are in turn held in position by retainer plates. In order to maintain spring-loaded pressure and to provide a sealed interface between the ball seat and the adapter cylinder, spring seal assemblies are disposed within the adapter cylinder and between the ball seat and corresponding retainer plate. These spring seal assemblies each include an annular seal portion arranged to fit in the corner intersection of the ball seat and adapter cylinder, a conical positioning ring, a back-up ring and a Belleville washer which is in turn backed up by the corresponding retaining plate.

10 Claims, 6 Drawing Figures

BALL VALVE HAVING IMPROVED SEAL MEANS

BACKGROUND OF THE INVENTION

This invention relates in general to ball valves and improved seals for such valves. More particularly, the invention relates to such valves which incorporate all-metal component parts.

In general, ball valves are relatively low-cost devices which may be changed from an open to a closed position or vice versa with only a quarter turn of the ball-controlling handle. The ball plug typically has a full bore therethrough and the valve is designed to provide unimpeded flow through the full bore with a minimum of pressure drop. The ball plug-controlling handle indicates the open-to-closed position of the valve such that the degree of flow can be ascertained by looking at the handle position. The ball plug is supported within the center of the valve flow passageway by top and bottom annular seats. These seats perform the function of sealing off the remainder of the valve from the self-wiping action as the ball plug rotates. This self-wiping action prevents the buildup of contamination which might impede full closure of the valve.

Due to the fact that the bulk of flow control does not occur within a minor movement of the handle, such valves are well suited for certain types of flow control and have relatively good throttling characteristics at low flow conditions. Typically, in order to provide a good sealing characteristics around the ball plug, the annular seats are often fabricated from a polymeric material such as elastic rubber or polyethylene compounds. These types of material offer the advantage of being deformable at moderately low pressure levels so that machining and/or molding tolerances can be relaxed over what would be required for harder materials, and the resultant sealing face will still conform to the ball plug surface contour which it contacts.

Other seals which may be used within the valve are typically conventional rubber O-ring-type seals which offer similar advantages of relaxed tolerances and the ability to readily adapt to the surfaces against which they are to seal. One disadvantage to the use of such synthetic materials within this type of valve is that the valve will often not be acceptable for the transfer of certain types of fluids and will be limited by what upper temperature it can withstand without performance being adversely affected. High-temperature situations may occur either by means of the exterior environment into which he particular valve may be placed or by the nature of the fluid which is being controlled and routed by the valve. However, since the majority of such valves is constructed of metal, even if the exterior atmosphere is at standard conditions, heat conduction from a high-temperature fluid passing through the valve will result in the entire valve being at an elevated temperature. Therefore, for either of these high-temperature situations to which the valve may be subjected, rubber and synthetic compounds are generally not acceptable.

The following list of patents provides a sampling of ball valve designs which have been conceived in an effort to try and overcome one or more of the particular disadvantages which a certain style of ball valve might have, depending on the intended application.

| Pat. No. | Patentee | Issue Date |
|---|---|---|
| 3,722,856 | Koch et al. | 3/27/73 |
| 4,066,881 | Gaillard | 2/08/77 |
| 3,617,025 | Gerbic | 11/02/71 |
| 3,960,363 | Domyan | 6/01/76 |
| 3,717,323 | Geipel | 2/20/73 |
| 3,520,512 | Huber | 7/14/70 |
| 3,549,122 | Graham | 12/22/70 |
| 3,669,406 | Moore | 6/13/72 |
| 2,297,161 | Newton | 9/29/42 |
| 3,218,024 | Kroekel | 11/16/65 |
| 3,266,769 | Shand | 8/16/66 |
| 2,837,308 | Shand | 6/03/58 |
| 3,542,335 | Scaramucci | 11/24/70 |
| 3,207,524 | Trbovich | 9/21/65 |

Koch et al. discloses a ball valve with separate end fittings which permit the valve to serve as a union without disturbing the valve member. O-rings are used to facilitate sealing between the valve body and the end fittings and two seat-defining rings engage the exterior of the ball about the inlet and outlet flow passages.

Gaillard discloses a fluid-tight packing for closure devices such as ball valves which are designed to be compressed between two components of the device. The packing is cut from a sheet of carbonaceous material which retains its effectiveness at temperatures in the order of 600 degrees Centigrade.

Gerbic discloses a ball valve with retractable rings wherein the seat rings may be retracted for free, incremental operation of the valve. It is suggested that with conventional ball valves the drag of the seat ring against the ball renders its virtually impossible to achieve precision control. The drag may be alleviated by retracting the seat rings while the valve is being operated.

Domyan discloses a ball valve with an actuator wherein a seal assembly with a combination O-ring swivel and seal for producing a tight seal is hidden in a pocket isolated from the flow of fluid through the valve by an inlet reentrant flange and the valve body. The ball valve also includes a spring which urges the seal of the assembly against the spherical surfaces of the ball.

Geipel discloses a ball valve having a novel seat arrangement wherein the seat rings, placed on opposite sides of the ball closure member, are each retained by a ferrule which is screwed into the valve body. The annular valve seats are formed of a yieldable, resilient material and are retained against a shoulder in the valve body by the tightening action of the ferrules.

Graham discloses a sealed ball valve wherein a rotatable valve controls the rate of fluid flow therethrough and is engaged by a sealing means which includes annular members of different materials and rigidity adjacently spaced to each other and engaging the ball. Specifically, split annular discs are stacked together in tetrafluoroethylene resin such that ball pressure under a closed condition will cause the sealing means to yield rather than deforming the ball. However, with the arrangement of individual annular rings, it appears that uniform and proper positioning of each ring individually would be difficult to achieve without extensive manufacturing time and expense. Furthermore, maintaining suitable full sealing contact of these various rings against the ball plug surface would appear to be quite difficult.

Moore discloses a ball valve wherein an annular seal is held in place by an edge-anchored annular retainer.

The retainer is oversized for the valve housing and on installation resides in a state of compression.

Newton discloses a seat ring for ball valves wherein a concavo-convex ring of flexible elastic material is mounted within the valve casing and provides the seat ring. Upon assembly with the closure member, a greater bearing load is provided at the outer periphery of the seat ring.

Kroekel discloses a fluid motor-actuated ball valve wherein the ball valve may be opened at a preselected speed. The design disclosed is a ball valve adjusting screw and lock nut which set the vertical height of the ball and includes bellows for adjusting the pressure of sealing at different seal locations.

Shand ('769) discloses a fluid contrtol valve having rockable sealing means. As disclosed by FIG. 4, one of the sealing arrangements includes a bellows member which is sealed to a tubular member which in turn seals against the ball plug. Connection 16 in combination with casing 11 clamps the bellows member in place.

Shand ('308) discloes a fluid control valve wherein the seal against the ball plug is achieved by a combination of parts. This combination includes a seating ring, diaphragm, a metal ring member and a contact spring.

Scaramucci discloses a valve seal which is continually biased toward the valve member. In most of the arrangements disclosed, the seal is created by means of an elastomer member pressing against the ball plug, an L-shaped ring acting on the elastomer member and a tensioning member acting on the L-shaped ring.

Trbovich discloses a seal which is generally V-shaped in transverse section. This shape enables the ends to be compressed together when in use, yet flex outwardly with expansion or positional shifting of the two members between which the seal is disposed.

In addition to the fact that typical ball valves are limited in their application by the fluid being conducted and the operating temperature range, such valves also possess a further disadvantage when they are not provided with spring tension means in order to maintain the annular seats in direct sealing contact with the ball plug. Designs which merely clamp the polymeric seat members against the ball plug do not provide means for adjusting the pressure on the annular seats so that sealing contact can be preserved as the continued use of the ball valve gradually wears down the annular seats or loosens their fit against the ball plug. Although certain ball valve designs may include materials for the seats which are somewhat temperature-resistant, such as disclosed by the Graham patent, which includes metal rings and a polytetrafluoroethylene resin, these same devices also typically incorporate O-rings as part of the seal between the valve body and the ball plug stem. Therefore, although the flow passageway may be somewhat temperature-resistant and the sealing of the seat to the ball plug maintained over elevated temperature ranges, the entire device is not suitable for use in an elevated temperature environment due to the presence of the synthetic rubber material used fore the O-rings.

The Gaillard patent discloes a valve device which is designed and intended for high-temperature application while still preserving fluid-tightness. However, the valve device incorporates a graphite ring between the connecting flange and the valve body, and since the connecting flange forces the ball plug seal seats against the ball plug, there is no spring tension by which fluid-tight sealing can be preserved during the life of the valve.

SUMMARY OF THE INVENTION

A ball valve operable between a fully-open position and a closed position for regulating fluid flow according to one embodiment of the present invention comprises a valve body having a flow passageway extending therethrough, a ball plug member disposed within said flow passageway and having a flow hole therethrough, the flow hole terminating in open ends adjacent the exterior surface of the ball plug, a pair of oppositely positioned ball seats, each seat being cooperatively disposed in sealing contact against the outer surface of the ball plug with a corresponding circular line of contact, each of the circular lines of contact encompassing the open ends of the flow hole, and a pair of spring seals disposed within the valve body and positioned around the flow passageway, one spring seal on each side of the ball plug, and each of the spring seals including an annular seal portion contiguous to its corresponding ball seat and a conical annular ring portion acting upon its corresponding annular seal portion.

One object of the present invention is to provide an improved ball valve with an improved seal therein.

Related objects and advantages of the present invention will be apparent from the following description.

DESCRIPTION OF THE PREFERRED EMBODIMENT

Figure 1:
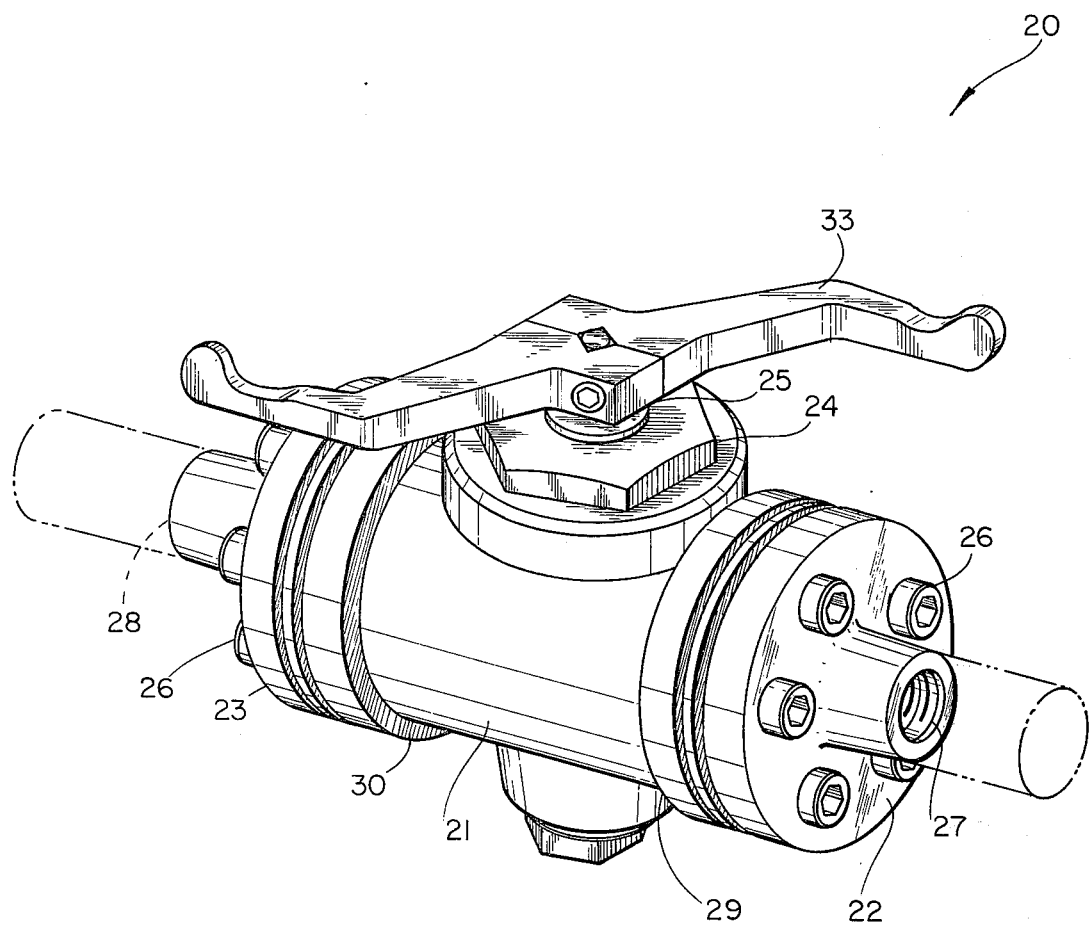
FIG. 1 is a perspective view of a ball valve according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated ball valve 20 which includes a valve body 21, oppositely disposed end fittings 22 and 23, a ball plug stem 25 which extends upwardly to the valve body and a bonnet member 24 which is threadedly received by the valve body 21 and cooperatively engages the ball plug (see FIG. 2) for quarter turning of the ball plug. Valve body 21 is fabricated from a rigid, durable material, typically metal, and is machined with various apertures and surfaces so as to accept the various components associated with ball valve 20 which will be described in greater detail hereinafter.

End fittings 22 and 23 are rigidly attached to the valve body by means of suitable threaded fasteners such as bolts 26 and each end fitting is internally threaded for connecting to a suitable flow line. Internally threaded surfaces 27 and 28 in corresponding end fittings 22 and 23 are each sized according to the desired line size and suitable for most coupling fittings which might be associated with the particular flow lines to be connected to ball valve 20. Extending between ends 29 and 30 of valve body 21 is a flow passageway 31 (see FIG. 2), and disposed within the approximate center of flow passageway 31 is a ball plug 32 which cooperatively engages ball plug stem 25 and is secured in position by key 34. This particular assembly of ball plug 32 and ball plug stem 25 enables the ball plug to be turned by means of handle 33 between a fully-open position and a closed position. The handle is contoured so as to denote by its position whether or not the ball plug is in an open or closed orientation. When the outermost ends of the handle are oriented so as to be substantially parallel to the direction of flow through the valve, the ball plug is in a fully-open position. Conversely, when the handle is turned so that the outermost ends are substantially perpendicular to the direction of flow through the valve, then the ball plug is at or near its closed position. As an alternative to this approach, the valve body and bonnet member may be contoured so as to control and limit the turning to 90 degrees.

Figure 2:
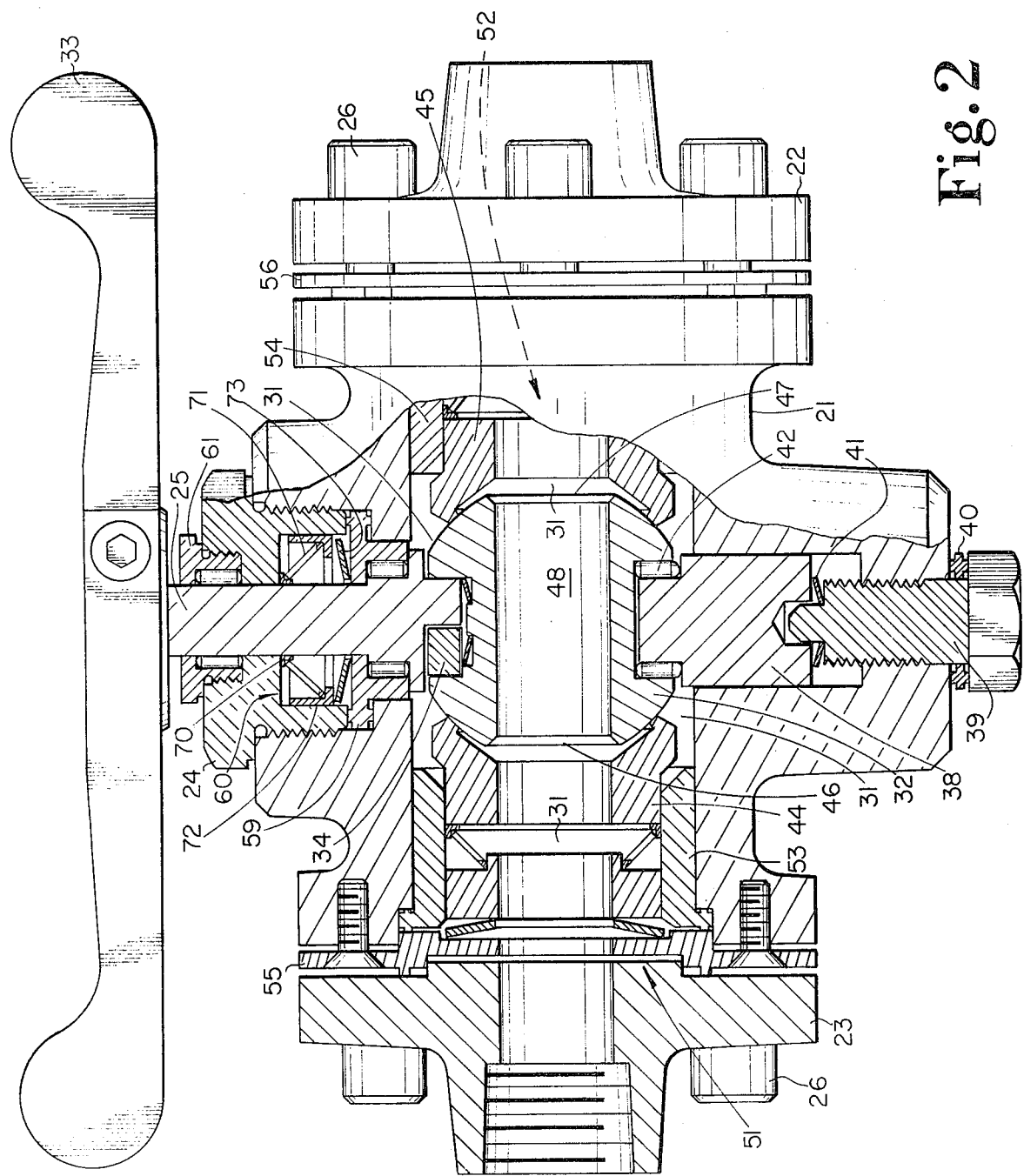
FIG. 2 is a fragmentary side elevation view of the FIG. 1 ball valve.

The internal details of ball valve 20 as illustrated in FIG. 2 are in many respects somewhat typical to those found in conventionally designed ball valves. What is intended by this statement is that the basic principles of operation remain somewhat the same, even though there is a number of improvements and advantages provided by the specific details of the design which constitutes the present invention. Valve body 21 is machined in a manner so as to provide a flow passageway completely therethrough from one end to the other. The ball plug is placed within this flow passageway and is suspended or supported in a desired location by means of lower positioning shaft 38 in combination with bolt 39, compression seal 40 and Belleville washer 41. The placement of shaft 38 into a recessed area of the ball plug is supported by means of needle bearing 42.

In order to control the flow through the ball plug in the most direct and efficient manner, a pair of oppositely positioned ball seats 44 and 45 are provided. Each of these ball seats are substantially the same and are arranged in a spring-loaded fashion so as to apply constant pressure at their contacting surfaces against the outer surface of ball plug 32. Each ball seat is machined to a contour that is compatible with the curvature and geometry of the ball plug so that sealing contact against the outer surface of the ball plug is possible. As should be appreciated, each ball seat has a circular line of contact with the ball plug and each of these circular lines of contact encompasses (surrounds) the open ends 46 and 47 of flow hole 48 which extends completely through ball plug 32.

In order to provide the spring-loaded force on each ball seat and additionally to assist in sealing between flow passageway 31 and the remainder of the ball valve, a pair of spring seal assemblies 51 and 52 (see FIG. 4) are provided. Although only spring seal assembly 51 is fully illustrated in FIG. 2, due to the fragmentary nature of that view, both spring seal assemblies are substantially the same and are further defined in greater detail by the additional drawings provided herein. Each spring seal assembly consists basically of four component parts or portions which cooperatively work together to both provide a spring force against the corresponding ball seat and to seal the flow passageway from other areas of the ball valve. While certain dimensions and specifics may vary slightly as to the design and construction of these spring seal assemblies as the specific nature of the individual ball valve varies, the static and dynamic principles remain much the same, regardless of the specific shape and contour.

Adapter cylinders 53 and 54 are rigidly secured within valve body 21 and are additionally seated and held in place by means of retainer plates 55 and 56. It is the retainer plates which provide the backing or backstop for each spring seal assembly and these retainer plates are each rigidly secured to the valve body by means of threaded fasteners as illustrated. As illustrated, cylinders 53 and 54 define inner surfaces as part of the valve body on opposite sides of ball plug 32. Each of these inner surfaces receives one end of a corresponding ball seat, with the opposite end of the ball seat being disposed in sealing contact against the ball plug.

Ball plug stem 25 which is keyed into the ball plug by means of key 34 extends upwardly through bonnet member 24 and then attaches to handle 33. This ball plug stem is positioned and held in place by a combination of component parts including needle bearing 59, spring seal assembly 60, needle bearing 61 and bonnet member 24.

Figure 3:
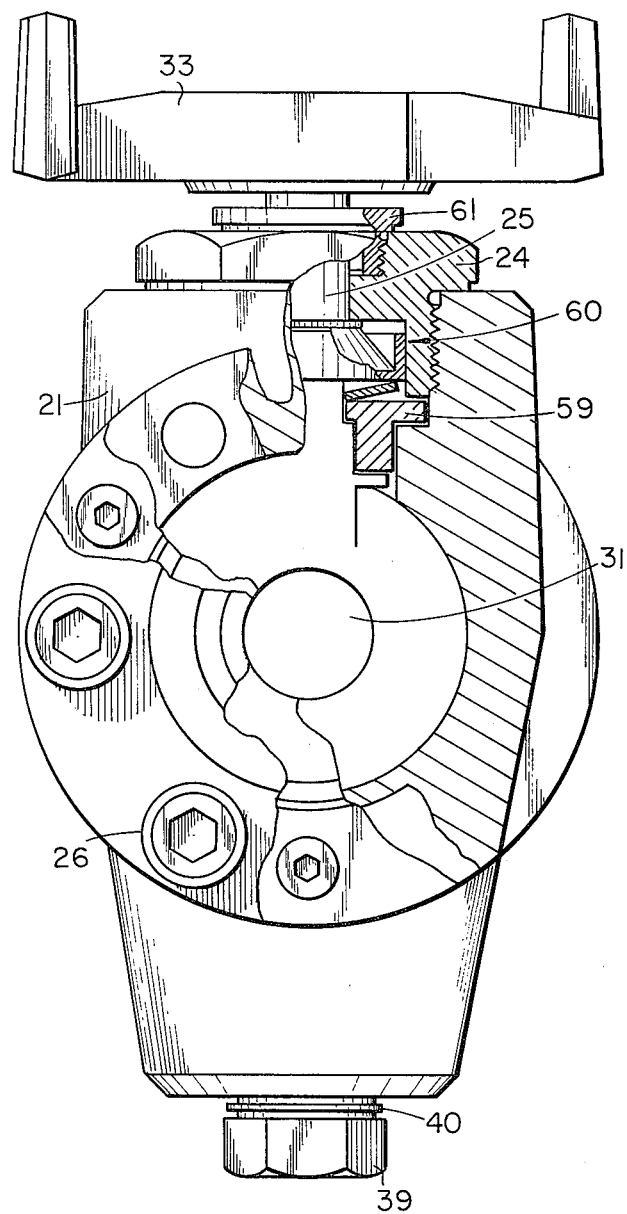
FIG. 3 is a fragmentary end elevation view of the FIG. 1 ball valve.

Referring to FIG. 3, the general end shape and configuration of ball valve 20 is illustrated and due to the fragmentary nature of this drawing, additional details are illustrated regarding spring seal assembly 60 and its relationship to the cooperating and surrounding parts that position and seal the ball plug stem within the valve body 21. While the general configuration and functioning nature of the spring seal assemblies 51, 52 and 60 are believed adequately illustrated by the drawings of FIGS. 2 and 3, it is to be understood that each of the component parts or portions comprising these spring seal assemblies are each generally cylindrical in nature and are stacked together in a cooperating manner such that the design, placement and material of each portion of each spring seal assembly complements the other portions. Further, as has been previously mentioned, the general static and dynamic characteristics of each spring seal assembly are substantially the same, although the precise dimensions and component part geometries are different as between either seal assembly 51 or 52 as compared to seal assembly 60. Part of the explanation for this difference is the nature of the location where each seal assembly is used. While spring seal assemblies 51 and 52 are substantially identical to each other, an option allowed because they are associated with sealing and the application of spring force to virtually identical ball seats, spring seal assembly 60 is used for sealing around the ball plug stem.

Figure 4:
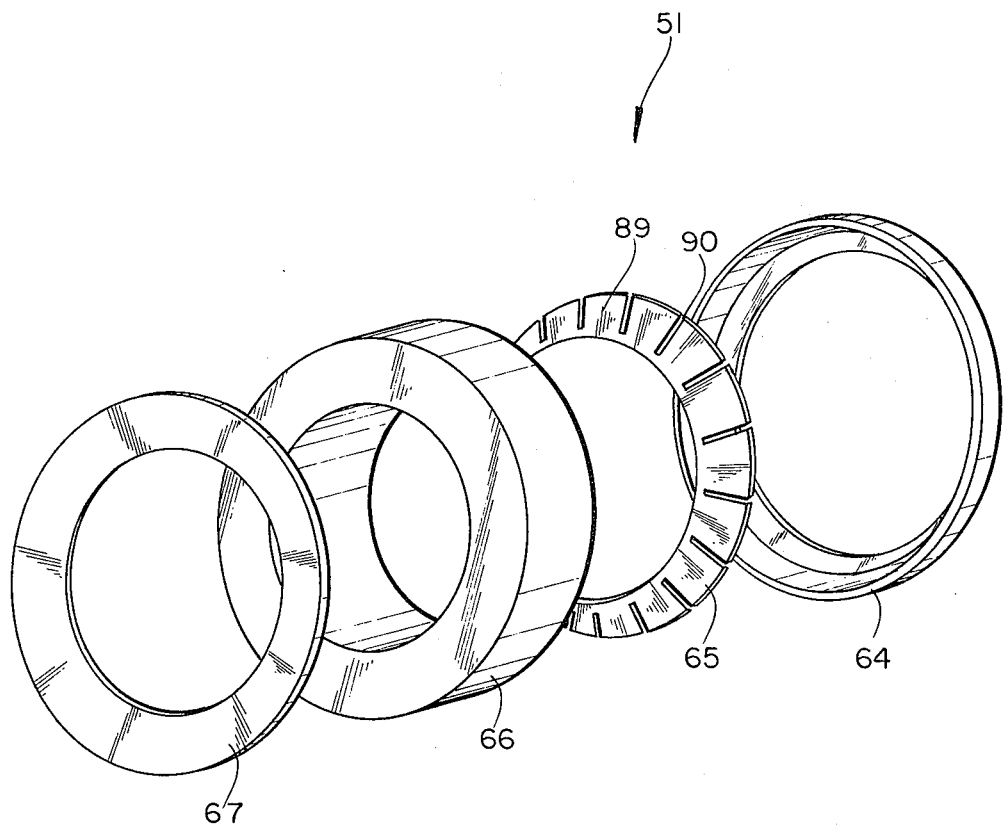
FIG. 4 is an exploded view of a spring seal comprising a portion of the FIG. 1 ball valve.

Referring to FIG. 4, spring seal assembly 51 is illustrated, and as has been previously described, spring seal assembly 51 is virtually identical to spring seal assembly 52 and they each include a series of four component parts or portions which are illustrated in exploded-view form. The four component parts or portions include annular seal 64, conical positioning ring 65, back-up ring 66 and Belleville washer 67. As can be appreciated from the FIG. 2 illustration, annular seal 64 is positioned at the corner junction between adapter cylinder 53 and ball seat 44. Back-up ring 66 is positioned in a manner very similar to ball seat 44 and includes a flanged contour so as to provide a corner for bracing and support of conical positioning ring 65. Thus, ring 65 extends between the flanged corner of back-up ring 66 and the corner intersection between ball seat 44 and adapter cylinder 53. Finally, Belleville washer 67 lays between retainer plate 55 and back-up ring 66. In order to retain the Belleville washer in its desired position, retainer plate 55 includes a counterbored surface so that there is an interior corner against which the Belleville washer rests.

As has been previously described, spring seal assembly 51 provides both a spring force as well as sealing for ball seat 44. The spring force is required in order to push the ball seat into contiguous contact against the exterior surface of the ball plug 32. However, with thermal contraction and expansion, ball seat 44 may vary both as to its diameter dimension as well as movement lengthwise in a direction substantially parallel to the longitudinal axis of flow passageway 31. Such longitudinal movement causes ball seat 44 to push against annular seal 64 which in turn pushes against conical positioning ring 65. Due to the spring nature of the conical positioning ring and the spring nature of Belleville washer 67, this type of movement may be easily accommodated. When such movement occurs, annular seal 64 must also move and its small size and malleable nature permitted to slide or expand radially relative to adapter cylinder 53 without losing or breaking its seal between the adapter cylinder and the ball seat. The double-flanged cross-sectional shape of annular seal 64 wherein one flange extends along the surface of that for cylinder 53 while the other flange extends along the end surface of ball seat 44, means that even diameter dimensional changes to the ball seat will not allow the seal between the ball seat and the adapter cylinder to be broken. The ability of conical positioning ring 65 to expand radially outward when clearance is created by thermal expansion cooperates with the small size and elastic nature of annular seal 64 in order to maintain a sealed interface.

What is created by the construction of spring seal assembly 51 is a combination of component parts or portions which may be independently and individually manufactured, yet which cooperatively work together in a stacked arrangement, as illustrated. In this regard, if there is an out-of-tolerance part or a component part failure, that particular item may be easily replaced without the necessity to completely replace the entire spring seal assembly. For example, if the Belleville washer is to be replaced, all that needs to be done is to remove end fitting 23 and retainer plate 55 and insert a new Belleville washer. This type of replacement will not in any way affect the remaining three component parts of the corresponding spring seal assembly. Of added value is the integrity of the seal that is created between the ball seat 44 and adapter cylinder 53. The very strong and reliable seal prevents any leakage of the passing fluid into other portions of the ball valve.

A similar combination of component parts exists for spring seal assembly 60. However, due to the detailed description already provided for spring seal assemblies 51 and 52, a similar detailed description is not believed necessary. As can be appreciated from the FIG. 2 illustration, spring seal assembly 60 includes an annular seal 70, a conical positioning ring 71, a back-up ring 72 and a Belleville washer 73.

Figure 5:
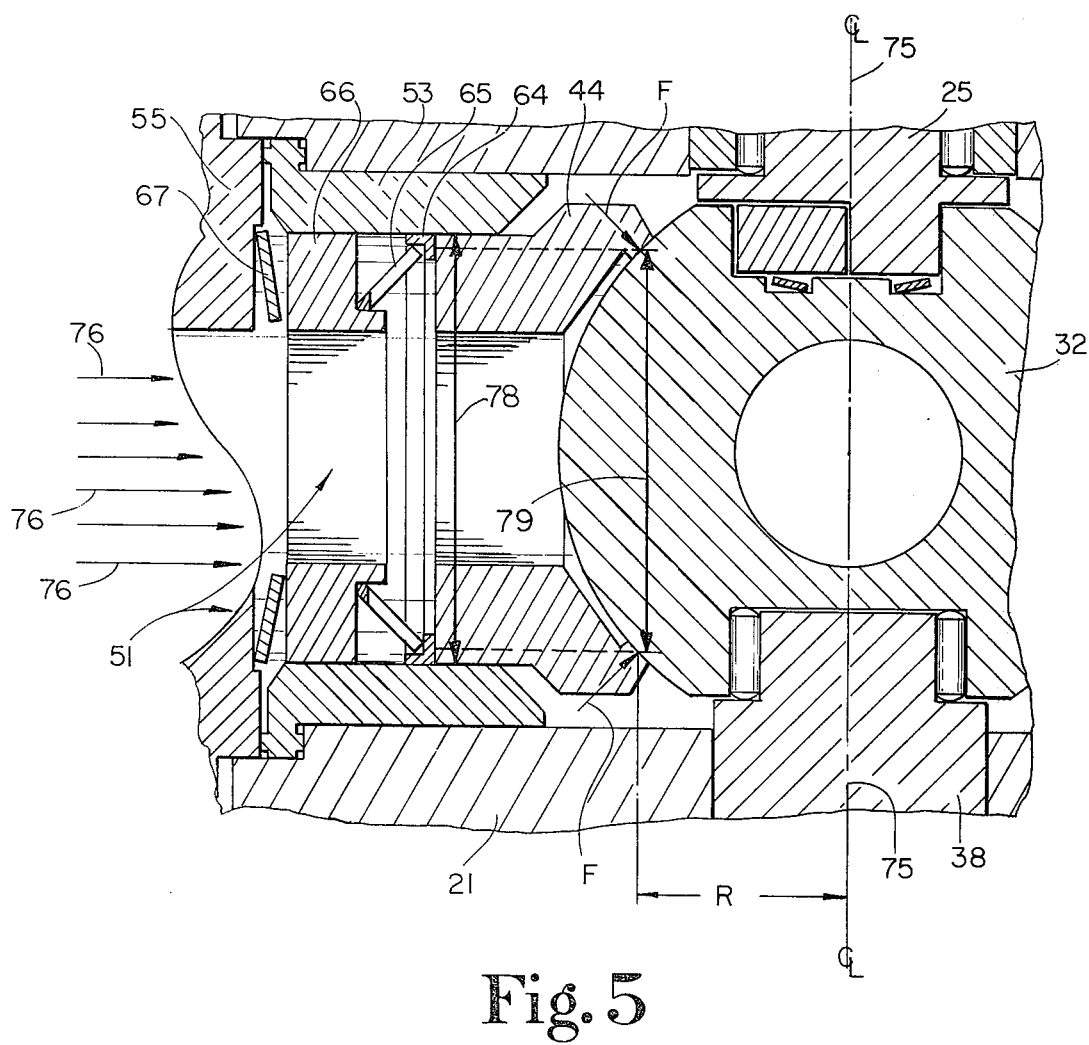
FIG. 5 is a schematic illustration of forces and component interactions within the FIG. 1 ball valve.

Referring to FIG. 5, spring seal assembly 51 is illustrated in greater detail, with ball plug 32 turned 90 degrees from its orientation of FIG. 2 thereby placing the ball valve in a fully closed condition. In this closed condition, upstream pressure by the blocked flow is represented by force lines 76. The force acting to urge the conical ball seat 44 against the ball plug 32 is equal to the sum of the mechanical spring force of Belleville washer 67 plus the net effective hydraulic force acting on conical ball seat 44. The difference between diameter 79 and diameter 78 when converted into an area equivalence corresponds to the net effective area over which the hydraulic force acts. Diameter 79 coincides with the location of force F and diameter 78 corresponds to the outside diameter of annular seal 64.

The total hydraulic force against the ball plug which is supported by shaft 38 and ball plug stem 25 is the line pressure times the net effective area of the seal diameter. The drawings in accompanyment with the foregoing analysis clearly reveal the positive seal that is maintained the whole time by the present invention.

the combination of the mechanical force associated with prepositioning the spring seal assemblies and the net fluid pressure acting on ball seat 44 toward ball plug 32 can be converted into vector components. One of these vector components will be a sealing force denoted as F, and while force vector F is indicated at only two locations in the full section view of FIG. 5, it is to be understood that this force vector is circular in nature and constitutes the nominal force required to maintain a sealed interface between seat 44 and ball plug 32. Due to the fact that force F is at a 45 degree angle relative to the fluid pressure direction (substantially parallel to the direction of flow), the magnitude of force F is equal to the sine of an angle of 45 degrees times the sum of the net fluid pressure force and the prepositioning mechanical force.

In order to evaluate the nature of the torque required to turn the ball plug from its closed position to an open position with force F acting to press the seat 44 against plug 32, it should be understood that this contacting force F acts at a radius R from centerline 75. The turning torque required on the stem of the ball valve is thus equal to force F times radius R times a coefficient of friction. This coefficient of friction will of course vary, but is determined based upon the nature of the materials used for the ball seat and the ball plug. Since there is only a very slight area for the fluid force to act upon, the ball seat contact against the ball plug will not permit leakage, even with only a minimal force F. Consequently, there is a very low torque requirement for turning the ball valve.

Figure 6:
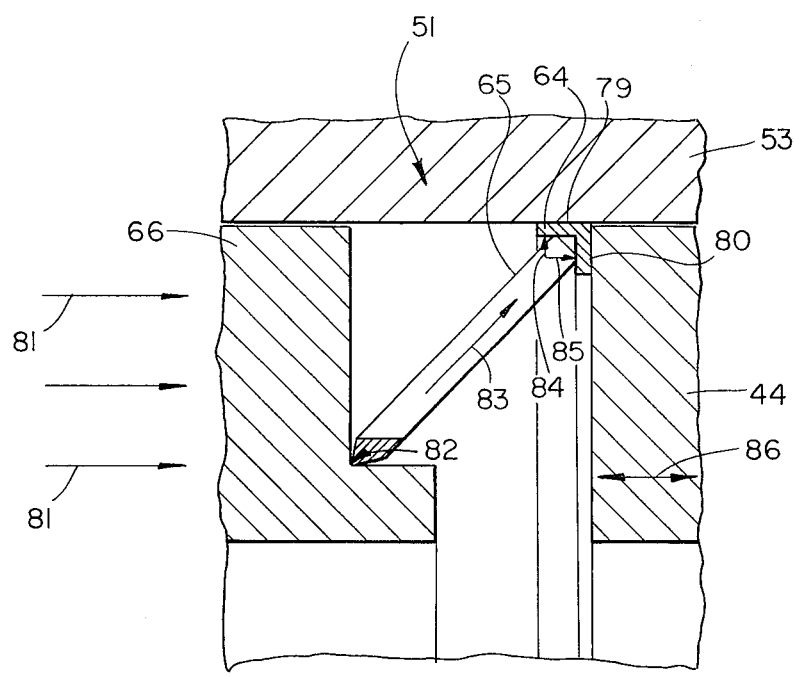
FIG. 6 is a schematic illustration of certain forces acting upon the FIG. 4 spring seal.

Referring to FIG. 6, a portion of spring seal assembly 51 is illustrated in still greater detail. Those portions illustrated include the annular seal 64, the conical positioning ring 65 and a portion of back-up ring 66. As has been previously described, annular seal 64 includes two flange portions 79 and 80 which are oriented at 90 degrees, one relative to the other. This corner shape which annular seal 64 has provides two substantially flat surfaces, one in contact with adapter cylinder 53 and the other (flange 80) in contact with ball seat 44. The forces acting on back-up ring 66 are represented by arrows 81 and these forces include the spring-loaded force created by Belleville washer 67 as well as the pressure forces created by the line pressure for any fluid which may be blocked by the ball plug. These various forces as represented by arrows 81 are initially oriented in a direction which is substantially parallel to the direction of flow through the ball valve. However, by the presence of conical positioning ring 65 as disposed between flange corner 82 associated with the back-up ring and the annular seal, these substantially parallel forces are converted into a force vector represented by arrow 83. This force vector thus translates into a pair of force vectors indicated by arrows 84 and 85. These two force vectors apply sealing pressure to flange 79 and flange 80, respectively.

As ball seat 44 may change in longitudinal movement as denoted by arrow 86, it may also change dimensionally in its diameter measurement. Regardless of these movements or dimensional shifts the sealed relationship which must be provided by spring seal assembly 51 is maintained.

Flange 79 will typically be subjected to sliding friction when linear movement results in the direction of arrow 86, while this type of movement will affect the sealing force pressure on flange 80. Dimensional shifts in the diameter size of ball seat 44 will result in sliding friction of the ball seat across the face of flange 80. This dynamic hydraulic force retains the spring seal assembly in its intended position of contact between the two surfaces noted regardless of the changes which occur within the valve body of ball valve 20. Additionally, while the Belleville washer 67 accounts for some of the spring force, conical positioning ring 65 also has certain spring characteristics due to its flexible nature. As indicated in FIG. 4, conical positioning ring 65 includes a plurality of individually movable fingers 89 which are separated by slots 90. Since these slots are clearly not cut completely through ring 65, but are cut quite deep into the ring, fingers 89 remain quite flexible, yet still quite sturdy. Consequently, even slight positional shifts of the ball seat can be accommodated without stressing or bending annular seal 64. As such minute dimensional shifts or movement result in a force being applied to annular seal 64, it is the fingers 89 which maintain seal 64 in an effective position. Consequently, when a dimensional shift or movement recedes, fingers 89 follow the positional change.

The size of annular seal 64 is so small that is able to be elastically deformed as necessary in order to take up any dimensional variations while still maintaining sealing contact. In the exemplary embodiment, this seal has a radial cross-sectional area of approximately 0.001 square inches. The deformation force is provided by conical positioning ring 65 as part of spring seal assembly 51. Due to the slotted and finger design of ring 65, it is able to expand radially and lineraly from its initial preloaded condition. Such expansion by the fingers 89 expands the annular seal outwardly, constantly maintaining the seal integrity.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A ball valve operable between a full-open position and a closed position for regulating fluid flow, said ball valve comprising:
    a valve body having a flow passageway extending therethrough and arranged to define a first inner surface and a second inner surface;
    a ball plug member disposed within said flow passageway between said first and second inner surfaces and having a flow hole therethrough, said flow hole terminating in open ends adjacent the exterior surface of said ball plug;
    a pair of oppositely positioned ball seats, each seat having a first end cooperatively disposed in sealing contact against the outer surface of said ball plug with a corresponding circular line of contact and a second end slidably received within a corresponding one of said inner surfaces and defining a corner intersection, each of said circular lines of contact encompassing the open ends of said flow hole; and
    a pair of spring seal assemblies disposed within said valve body and positioned around said flow passageway, one spring seal assembly on each side of said ball plug, each of said spring seal assemblies including an annular seal portion having two outer faces and an interior corner with one face disposed contiguous to its corresponding ball seat and the other face disposed contiguous to the corresponding inner surface of the corresponding corner intersection and positioning means disposed against said interior corner and adapted to impart two lines of contacting force to said annular seal portion, one of said lines of force being directed toward said corresponding inner surface and the other line of force being directed toward said corresponding ball seat.

2. The ball valve of claim 1 wherein each of said spring seal assemblies further includes a back-up ring and a spring washer.

3. The ball valve of claim 2 wherein the area of a radial cross section of said annular seal member is less than 0.002 square inches.

4. The ball valve of claim 1 wherein said positioning means includes a conical positioning ring arranged with an alternating series of slots and spring fingers.

5. The ball valve of claim 1 which further includes a pair of retainer plates and a pair of oppositely disposed adapter cylinders, each adapter cylinder being positioned between said valve body and a corresponding one of said ball seats and held in position by a corresponding one of said retainer plates.

6. The ball valve of claim 1 which further includes a ball plug stem cooperatively arranged for turning said ball plug and a spring seal assembly disposed about said ball plug stem.

7. A ball valve spring seal assembly for positioning within a ball valve and for sealing any flow through the main passageway of said ball valve from the remainder of said ball valve, said spring seal assembly comprising:
    an annular seal member;
    a conical positioning ring;
    a back-up ring;
    a spring washer; and
    said annular seal member, conical positioning ring, back-up ring and spring washer being arranged in a stacked configuration wherein said conical positioning ring is disposed between said annular seal member and said back-up ring.

8. The ball valve spring seal assembly of claim 7 wherein said conical positioning ring is arranged with an alternating series of slots and spring fingers.

9. The ball valve spring seal of claim 8 wherein the area of a radial cross-section of said annular seal member is less than 0.002 square inches.

10. A ball valve spring seal assembly for positioning within a ball valve and for sealing any flow through the main passageway of said ball valve from the remainder of said ball valve, said spring seal assembly comprising:
    an annular seal member;
    a conical positioning ring;
    a back-up ring; and
    said annular seal member, conical positioning ring and back-up ring being arranged in a stacked configuration wherein said conical positioning ring is disposed between said annular seal member and said back-up ring.

* * * * *